United States Patent [19]

Boersma et al.

[11] 3,907,851

[45] Sept. 23, 1975

[54] NOVEL PROCESS FOR PRODUCING ORGANOSILICON HYDROXY COMPOUNDS AND NOVEL ORGANOSILICON ADDUCTS

[75] Inventors: Robert P. Boersma; Vincent T. Chuang, both of Marietta, Ohio

[73] Assignee: Union Carbide Corporation, New York, N.Y.

[22] Filed: Nov. 23, 1973

[21] Appl. No.: 418,420

Related U.S. Application Data

[62] Division of Ser. No. 129,561, March 30, 1971, Pat. No. 3,794,673.

[52] U.S. Cl. ... 260/448.2 B; 252/49.6; 260/2.5 AM; 260/2.5 AN; 260/2.5 AP; 260/448.2 E
[51] Int. Cl.² ..................... C07F 7/08; C07F 7/18
[58] Field of Search ............. 260/448.2 B, 448.8 R

[56] References Cited
UNITED STATES PATENTS

| | | | |
|---|---|---|---|
| 3,398,104 | 8/1968 | Haluska | 260/448.2 B X |
| 3,402,192 | 9/1968 | Haluska | 260/448.2 B |
| 3,628,907 | 12/1971 | Fish | 260/448.2 B X |
| 3,637,783 | 1/1972 | Haluska | 260/448.2 B |
| 3,794,673 | 2/1974 | Boersma et al. | 260/448.2 B |

Primary Examiner—Paul F. Shaver
Attorney, Agent, or Firm—Eugene C. Trautlein

[57] ABSTRACT

This invention relates to a novel process for producing organosilicon hydroxy compounds by reacting a hydrosilicon compound with the reaction product of an enol ether and an olefinically unsaturated compound containing a hydroxyl group to produce an organosilicon adduct and then hydrolyzing the organosilicon adduct. The invention also relates to the organosilicon adducts (e.g., organosilicon acetals and esters) as novel compositions of matter. The novel process circumvents various side reactions that occur in other methods for producing organosilicon hydroxy compounds from hydrosilicon compounds.

9 Claims, No Drawings

NOVEL PROCESS FOR PRODUCING ORGANOSILICON HYDROXY COMPOUNDS AND NOVEL ORGANOSILICON ADDUCTS

CROSS REFERENCE TO RELATED APPLICATION

This application is a division of U.S. patent application Ser. No. 129,561, filed Mar. 30, 1971 now U.S. Pat. No. 3,794,673.

Siloxane-polyoxyalkylene blocked copolymers have found wide acceptance as foam stabilizers in the production of polyurethane foams. A preferred class of such blocked copolymers are those wherein the blocks are linked by silicon to carbon bonds. These preferred block copolymers ("non-hydrolyzable" blocked copolymers) exhibit a greater degree of hydrolytic stability than similar block copolymers in which the blocks are linked by silicon to oxygen to carbon bonds. It is at times desirable to employ such preferred non-hydrolyzable blocked copolymers as foam stabilizers of polyurethane foams intended for use as thermal insulation. In this use, it is desirable that the polyurethane foams have mostly or exclusively closed cells rather than open cells because open cells provide a relatively thermally conductive gas path through the foam.

In the production of closed cell polyurethane foams for use as thermal insulating materials, non-hydrolyzable siloxane-polyoxyalkylene block copolymers wherein the polyoxyalkylene block contains alcoholic hydroxyl endblocked groups have proven particularly useful.

One known procedure for producing non-hydrolyzable siloxane-polyoxyalkylene block copolymers wherein the polyoxyalkylene blocks contain alcoholic hydroxyl endblocking groups envolves an addition reaction of a siloxane containing a SiH group and a linear polyoxyalkylene polymer whose linear chain is endblocked at one end with an alkenyl group and at the other end with either an alcoholic hydroxyl group or a group convertible to an alcoholic hydroxyl group (e.g., trimethylsiloxy groups produced by the reaction of the hydroxyl group with trimethylchlorosilane). The addition reaction is usually conducted in the presence of a chloroplatinic acid catalyst (e.g., chloroplatinic acid, its hydrate or a complex of chloroplatinic acid). The SiH groups add to the alkenyl groups to produce the block copolymer. When the polyoxyalkylene reactant contains an alcoholic hydroxyl endblocking group, such groups can also react to some extent with the SiH groups thereby decreasing the content of the desired hydroxyl groups in the blocked copolymer product. This side reaction also increases the viscosity of the block copolymer product by crosslinking the siloxane blocks. Further, the endblocking allyl groups in the polyoxyalkylene reactant tend to isomerize to some extent to propenyl groups which can react with the hydroxyl endblocking groups in the polyoxyalkylene reactant or in the block copolymer to form acetal groups. The latter side reaction can also lead to an undesirable viscosity increase in the block copolymer product.

When the polyoxyalkylene reactant contains an endblocking group convertible to a hydroxyl group, the undesirable side reactions of the hydroxyl group with the SiH groups and propenyl groups do not occur but the block copolymer formed therefrom must be further processed to regenerate the hydroxyl groups. Further, the use of trimethylchlorosilane as a blocking agent for the hydroxyl groups is not entirely satisfactory. The reactions of the hydroxy compound and the trimethylchlorosilane usually requires an amine acid acceptor to achieve acceptable reaction rates. The acid acceptor forms a salt with by-product HCl and the salt is usually insoluble in the reaction mixture and so presents processing difficulties. Further, any excess amine acid acceptor can interfere with the subsequent platinum-catalyzed addition reaction. Other blocking techniques for the hydroxyl groups are theoretically possible. For example, acetic anhydride adds to the hydroxyl groups yielding acetoxy compounds. Hydrolysis can convert the acetoxy group back to free hydroxyl. However, the latter reaction is slow. Increased reactivity can be achieved by using a substituted acid such as trifluoroacetic acid but subsequent hydrolysis of the trifluoroacetoxy group can result in undesirable side reactions (e.g., siloxane rearrangement) because of the strong acid nature of the trifluoroacetic acid (pH about 2).

The above-described difficulties in producing organosilicon hydroxy compounds of the siloxane-polyoxyalkylene variety are also encountered in producing other types of organosilicon hydroxy compounds.

It is also known that by employing acid buffer solutions or basic compounds addition of SiH compounds to hydroxyl unsaturated compounds and catalyzed with chloroplatinic acid can be satisfactorily achieved in the presence of hydroxyl compounds such as water or alcohols. Although this technique is operable, the potential is still there for the side reactions to take place and care must be exercised to conduct the reaction, particularly on a large scale operation.

It is an object of this invention to provide a process for producing organosilicon hydroxy compounds from hydrosilicon compounds which process is relatively free of undesirable side reactions.

Another object of this invention is to provide novel organosilicon adducts that can be produced from hydrosilicon compounds and that can be readily hydrolyzed to produce organosilicon hydroxy compounds.

This invention provides a process which comprises:

I. reacting (a) an organosilicon compound containing an SiH group with (b) a reaction product formed by reacting (i) an olefinically unsaturated compound containing a hydroxyl group with (ii) an enol ether by the addition of the hydroxyl group of (i) to the olefinic double bond of (ii), the reaction of (a) and (b) being conducted in the presence of (c) a catalyst for the addition of SiH to the olefinic double bonds, to effect the addition of the SiH group of (a) to the olefinic double bond of (b); and II. subjecting the organosilicon adduct produced in (I) to hydrolytic condition to regenerate the hydroxyl group.

As used herein, "enol ether" denotes a compound having the structure:

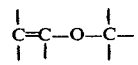

wherein the double bond is an olefinic double bond and the oxygen is an ether oxygen. The chemical nature of the reaction product used as a reactant in step (I) of the process of this invention will depend on the chemical nature of the olefinic hydroxy compound. When the olefinic hydroxy compound is an alcohol, the reaction product [and the organosilicon adduct intermediate formed in step (I)] will be an acetal. When the olefinic hydroxy compound is a carboxylic acid, the reaction product and the organosilicon adduct intermediate will be esters.

The formation of the reaction products of the acetal variety useful as reactants in the process of this invention can be illustrated by the equation:

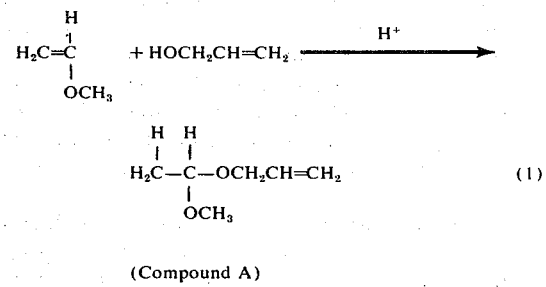

(Compound A)

The reaction involved in step (I) of the process of this invention to produce an organosilicon acetal adduct can be illustrated by the equation:

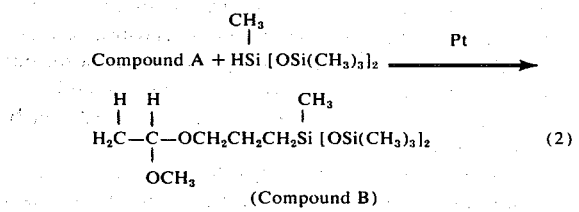

(Compound B)

The reaction involved in step (II) of the process of this invention to produce an organosilicon hydroxy compound of the alcohol variety can be illustrated by the equation:

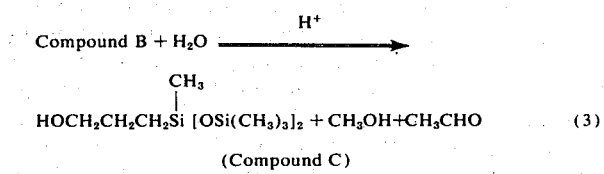

(Compound C)

The formation of organic ester useful in the process of this invention can be illustrated by the equation:

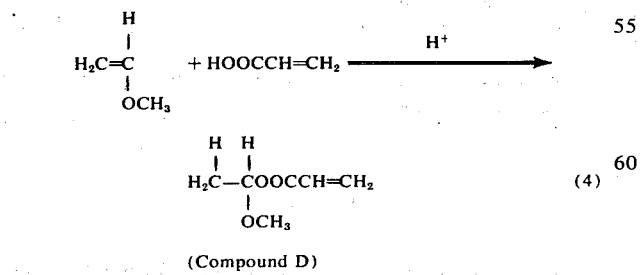

(Compound D)

The reaction involved in step (I) of the process of this invention to produce an organosilicon ester adduct can be illustrated by the equation:

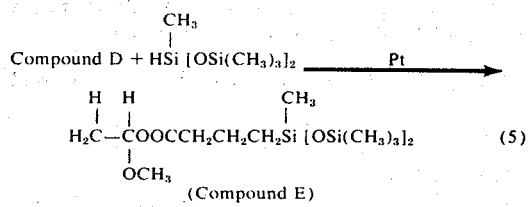

(Compound E)

The reaction involved in step (II) of the process of this invention to produce an organosilicon hydroxy compound of the carboxylic acid variety can be illustrated by the equation:

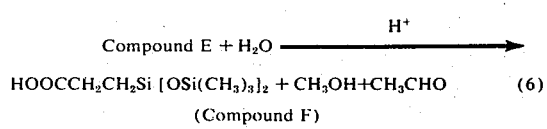

(Compound F)

This invention also provides novel organosilicon adducts which are the intermediates produced as the product of step (I) of the process of this invention. A preferred class of these novel adducts are siloxane acetals consisting essentially of:

A. at least one unit represented by the formula:

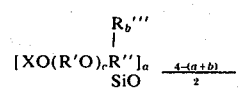

wherein XO— is a monovalent group derived from the addition of a hydroxyl group to the olefinic double bond of an enol ether, the oxygen in the XO— group being the oxygen of the hydroxy group that added to the enol ether to form the XO— group, $R'$ is an alkylene group containing at least two carbon atoms, $R''$ is an alkylene group containing at least two carbon atoms, $R'''$ is a monovalent hydrocarbon group free of aliphatic carbon to carbon multiple bonds, $a$ has a value from 1 to 3 inclusive, $b$ has a value from 0 to 2 inclusive, $c$ has a value of at least 0 [preferably from 5 to 50], and $(a+b)$ has a value from 1 to 3 inclusive; and B. units having the formula:

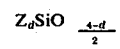

wherein Z is a monovalent hydrocarbon group free of aliphatic carbon to carbon multiple bonds and $d$ has a value from 1 to 3 inclusive. An especially preferred class of the novel siloxane of this invention are those defined above wherein unit (A) is more specifically defined by the formula:

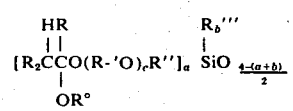

wherein $R°$ is a monovalent hydrocarbon group free of aliphatic carbon to carbon multiple bonds, R is $R°$ or hydrogen and the remaining symbols are as defined above.

Typical of the groups represented by R''' and Z in the above formulas are the alkyl groups (such as the methyl, ethyl, propyl, butyl and decyl groups), the aryl groups (such as the phenyl groups), the aralkyl groups such as the benzyl and beta-phenylethyl groups) and the alkaryl groups (such as the tolyl groups). Typical of the groups represented by R' and R'' in the above formulas are the ethyl, propyl, butyl and pentyl groups. The meanings of these symbols can vary in a given molecule (e.g., R''' can be methyl at one point in a molecule and ethyl at another).

Any enol ether can be employed in producing the reaction products useful as reactants in the process of this invention. Suitable enol ethers include the following compounds:

| FORMULA | NAME |
|---|---|
| $CH_3-O-CH=CH_2$ | Methyl vinyl ether |
| $CH_3-CH_2-O-CH=CH_2$ | Ethyl vinyl ether |
| $CH_3CH_2CH_2CH_2-O-CH=CH_2$ | n-Butyl vinyl ether |
| $(CH_3)_2CH-CH_2-O-CH=CH_2$ | iso-Butyl vinyl ether |
| $(CH_3)_2CH-O-CH=CH_2$ | iso-Propyl vinyl ether |
| $O-CH=CH-CH_2-CH_2-CH_2$ (cyclic) | Dihydropyran |
| $O-CH=CH-CH_2-CH_2-CHOCH_3$ (cyclic) | 2-Methoxy-2,3-dihydropyran |
| $O-CH=CH-CH_2-CH_2$ (cyclic) | Dihydrofuran |
| $H_2C=CH-O-CH_2-CH_2Cl$ | 2-Chloroethyl vinyl ether |
| $H_3C-\overset{H}{C}=\overset{H}{C}-O-CH_2CH_3$ | Ethyl 1-propenylether |
| $CH_3CH_2-O-\overset{CH_3}{\underset{\|}{C}}=CH_2$ | Ethyl isopropenyl ether |
| $CH_3-O-\overset{CH_3}{\underset{\|}{C}}=CH_2$ | Methyl isopropenyl ether |
| ⟨Ph⟩$-O-CH=CH_2$ | Phenyl vinyl ether |
| ⟨Ph⟩$-O-\overset{CH_3}{\underset{\|}{C}}=CH_2$ | Phenyl isopropenyl ether |
| $CH_3-O-$⟨cyclohexenyl⟩ | Methyl cyclohexenyl ether |
| $CH_3CH_2-O-$⟨cyclohexenyl⟩ | Ethyl cyclohexenyl ether |
| $CH_3-O-$⟨cyclopentenyl⟩ | Methyl cyclopentenyl ether |
| $CH_3-CH_2-O-$⟨cyclopentenyl⟩ | Ethyl cyclopentenyl ether |

The organosilicon compounds useful in the process of this invention include a wide variety of materials characterized by the presence of at least one SiH group. Examples of operative organosilicon compounds which may be employed herein, are silanes represented by the formula:

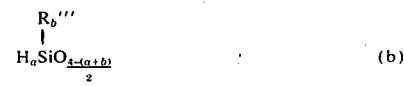   (a)

and siloxanes containing groups represented by the formula:

   (b)

Sush siloxanes can also contain other groups such as groups represented by the formula:

$$\frac{Z_d SiO_{4-d}}{2}$$   (c)

In formula (a) thru (c) R''', Z, a, b, (a+b) and d have the above defined meanings.

The process of the invention is generally applicable to organic compounds containing a hydroxyl group and olefinic unsaturation. Thus the process of this invention is applicable to alkenols, alkenyl substituted phenols and alkenyl carboxylic acids. Suitable phenol reactants include o-, m-, and p- allylphenols, eugenol, etc. Suitable carboxylic acid reactants include acrylic acid, methacrylic acid, vinylacetic acid, etc. Suitable alcohol reactants include alkenols (e.g., allyl alcohol, methallyl alcohol, butenol, pentenol, etc.), alkenyl ethers of polyols (especially the monoalkenyl ethers of polyoxyalkylene glycols) and alkenyl ethers of polyoxyalkylene polymers. Such alkenyl ethers of polyols: trimethylolethane monoallyl ether; trimethylolpropane monoallyl ether; trimethylolbutane monoallyl ether; and other monoallyl ethers of other trimethylolalkanes as well as the analogous diallyl others such as trimethyolopropane diallyl ether. Mono-, di-, and triallyl ethers of pentaerythritol. Mono- and di- allylethers of hexanetriol, 2-phenyl-2-allyloxymethyl-propane-1,3, diol; 2-phenyl-2-hydroxymethyl 1,3-diallyloxypropane; 2-cyclohexyl-2-allyloxymethylpropane-1,3 light diol and 2-cyclohexyl-2-hydroxymethyl-1,3-diallyloxy-propanediol. The formulas of typical alkenyl ethers suitable for use in the process of this invention are as follows:

| FORMULA | NAME |
|---|---|
| $CH_3CH_2C(CH_2OH)_2CH_2OCH_2CH=CH_2$ | Trimethylolpropane monoallyl ether |
| $CH_3CH_2C(CH_2OCH_2CH=CH_3)_2CH_2OH$ | Trimethylolpropane di-allyl ether |
| $C(CH_2OH)_3CH_2O-CH_2-CH=CH_2$ | Pentaerythritol monoallyl ether |
| $C_6H_5C(CH_2OH)_2CH_2OCH_2CH=CH_2$ | 2-Phenyl-2-allyloxymethyl Propane-1,3-diol |
| $C_6H_5C(CH_2OCH_2CH=CH_2)_2CH_2OH$ | 2-Phenyl-2-hydroxymethyl-1,3-diallyl-oxypropane |

The reaction products useful as reactants in the process of this invention can be produced by any suitable method. Thus the reaction products can be produced by reacting an olefinically unsaturated compound containing a hydroxyl group with an enol ether under acidic conditions in a hydrocarbon solvent for the reactants at non-elevated temperatures. The hydroxy compound should not be permitted to be in excess during the reaction. The concentration of water present, if any, should be kept low to minimize hydrolysis of the blocking group. Acidic conditions can be maintained

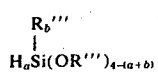

by use of hydrogen chloride, concentrated hydrochloric acid, sulfonic acids or ferric chloride. Suitable hydrocarbon solvents are those boiling at less than <110°C. at 1 atmospheric pressure (e.g., toluene and hexane). Suitable reaction temperatures are from 0° to 35°C. The total amount of the enol ether used is at least one mole per mole of the hydroxycompound. Preferably an excess (e.g., a 30 mol - % excess) of the enol ether is used. The crude reaction product is preferably neutralized (e.g., using aqueous sodium bicarbonate) and separated by volatile materials (e.g., by heating at reduced pressure while passing an inert gas through the crude product).

The silicon compound containing an SiH group is reacted with the enol ether-olefinic hydroxy reaction product in the presence of a catalyst for the addition of SiH to olefinic double bonds. Suitable catalysts include finely divided elemental platinum supported on charcoal or gamma alumina, platinum compounds such a chloroplatinic acid and complexes of such compounds with liquids (e.g., phosphines or nitriles). Preferably the platinum catalyst is present in an amount that provides from 20 to 50 parts by weight of elemental platinum per million parts by weight of the organic acetal and SiH compound.

The organosilicon adduct formed by reacting the enol ether-olefinic hydroxyl compound reaction product and the SiH compound is hydrolyzed to regenerate the hydroxy group by any suitable means. Preferably, the adduct is hydrolyzed using at least a 200 mol - % excess water at a pH from 3 to 4 inclusive. The pH can be maintained in the desired range using concentrated hydrochloric acid. During the hydrolysis of the group that is converted to the hydroxyl group (e.g., the acetal or ester group), any other hydrolyzable groups in the adduct may also hydrolyze (e.g., Si-alkoxy groups may hydrolyze to SiOH groups which may condense to form SiOSi linkages). The crude product of the hydrolysis reaction is preferably neutralized and separated from volatile materials as described above.

The organosilicon hydroxy compounds produced by the process of this invention are known compounds having known utilities. By way of illustration, those compounds of the nonhydrolyzable siloxane-polyoxyalkylene block copolymer variety wherein the polyoxyalkylene blocks contain hydroxyl endblocking groups are useful as foam stabilizers for rigid polyether polyurethane foams. The organosilicon adducts of this invention of the silane variety are useful as coupling agents to bond organic resins to inorganic substrates. The organosilicon adducts (intermediates) of this invention of the siloxane variety are depending to some extent on their specific structure, useful as metal to metal lubricants for steel surface, as lubricants for textile fibers and for fibrous glass and as foam stabilizers for polyether and polyester polyurethane foams. These organosilicon adducts can also be converted to organosilicon hydroxy compounds as described above.

The following Examples illustrate the present invention.

In the Examples the tradenames, symbols and abbreviations used have the following meanings:

| | |
|---|---|
| g. | grams |
| MW | molecular weight |
| % | percent by weight |
| Magnesol | magnesium silicate |
| ml. | milliliters |
| min. | minute |

EXAMPLE 1

A solution of 200 g. allyl alcohol started polyethylene oxide ($H_2C=CHCH_2O[CH_2CH_2O]_{7.8}H$) and 56.5 g. dihydropyran (1.0 OH group per 1.3 vinyl groups) was charged to a 500 ml three-necked flask equipped with a stirrer, thermometer and a condenser. The contents were cooled with an ice bath to 3°–5°C., and concentrated hydrochloric acid was added dropwise. Exotherm was observed immediately; with ice cooling a reaction temperature of 7°–10°C. was maintained. A total of 0.4 ml. of hydrochloric acid was added over a period of 20 min., at the end of which the reaction began to subside. The reaction mixture was neutralized with 3.0 g. of potassium bicarbonate and 30 ml. of water at room temperature and the water was removed as toluene axeotrope using 350 ml. toluene at 80°C. under nitrogen sparging. The yield (243 g.) was almost quantitative (theoretical 243.5 g.) the product had the average formula:

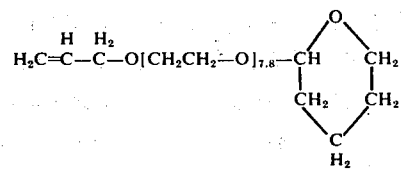

EXAMPLE 2

Employing the procedure of Example 1, 200 g. of $H_2C=CHCH_2O[CH_2CH_2O]_{7.8}H$, was reacted with 48 g. of ethyl vinyl ether (1.0 OH group per 1.3 vinyl groups) in the presence of 0.3 ml. of concentrated HCl (pH of 10% aqueous solution of the reaction mixture was 3.2). Water cooling was provided to maintain the reaction temperature of not higher than 30°C. The reaction was complete in 30 minutes and the mixture was subjected to neutralization with 2 ml. of dry propylene oxide (aqueous pH of the resultant solution was 4.8), and sparged with nitrogen stream at 50°C. for 30 minutes to afford 235.5 g. of the acetal product (theoretical yield 237 g.) which had the average formula:

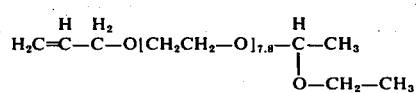

EXAMPLE 3

Using the same procedure as Example 2, except for stoichiometry of 1:1 (OH : vinyl), 200 g. of the polyether was reacted with 37 g. of ethyl vinyl ether to give 231 g. of the product, corresponding to 83% blocking efficiency (theoretical yield 237 g.).

EXAMPLE 4

The product obtained from Example 2 (118 g.) was reacted with 51.5 g. of hydrosiloxane having the formula:

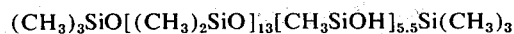

(a stoichiometry of 1.0 SiH group per 1.3 allyl groups) in the presence of 0.21 ml. of 10% chloroplatinic acid (50 parts by weight of platinum per million parts by weight of reactants) at 80°–90°C. The reaction was complete in 20 minutes, water cooling was necessary to maintain the reaction temperature below 95°C. The mixture was treated with 1 g. of sodium bicarbonate in 10 ml. of water, and the water was removed as toluene azeotrope, using 100 ml. toluene. The product thus obtained has a viscosity of 173 centistokes and had the average formula:

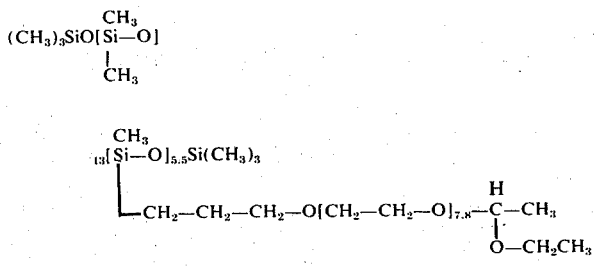

EXAMPLE 5

Following the reaction as shown in Example 4, the mixture was subjected to hydrolysis with 15 ml. of 1 N HCl solution at 75°C. for 15 minutes, neutralized with 3.5 g. of sodium bicarbonate in 10 ml. water and sparged at 80°C. with nitrogen in the presence of toluene (100 ml.) to remove acetaldehyde, ethanol and water. The product thus obtained had a viscosity of 273 centistokes and an OH content of 3.78% and had the average formula:

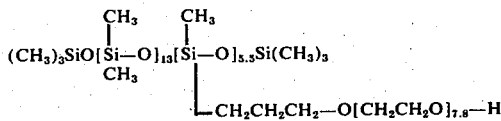

EXAMPLE 6

Addition and hydrolysis reactions using the blocked hydroxy compound obtained from Example 3 (231 g.) and 103 g. of the hydrosiloxane used in Example 4 under the same conditions as Examples 4 and 5 led to a product which had a viscosity of 317 centistokes and OH content of 3.56% and had the average formula:

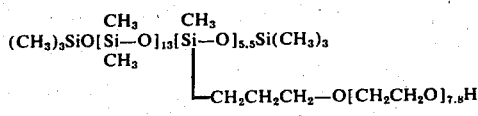

EXAMPLE 7

2-Allyloxyethanol (23.4 g., 0.22 moles) is reacted with vinyl ethyl ether (16.4 g., 0.238 moles) by gradual addition of 0.05 ml. of conc. hydrochloric acid to a mixture of those compounds. An ice-bath is provided so as to maintain a reaction temperature not to exceed 50°C. An acetal is produced. The reaction mixture is neutralized with 0.01 moles of propylene oxide and is used directly to react with 21.8 g. (0.18 moles) of trimethoxysilane in the presence of 0.1 ml. of 3.3% chloroplatinic (50 parts by weight of platinum per million parts by weight of reactants). An addition reaction occurs without application of external heat. The product is purified by distillation at reduced pressure, to give a compound having the formula: $(MeO)_3—Si—(CH_2)_3—O—CH_2CH_2OCH(CH_3)OCH_2CH_3$. This compound is treated with methanol in the presence of a catalytic amount of toluene sulfonic acid to give $(MeO)_3Si(CH_2)_3OCH_2CH_2OH$ or hydrolyzed using hydrochloric acid to give $[HOCH_2CH_2O(CH_2)_3SiO_{1.5}]_x$

EXAMPLE 8

A mixture of methacrylic acid (2.0 moles) and vinyl ethyl ether (2.2 moles) is charged to a 500-ml. three-necked flask fitted with a thermometer, condenser and a stirrer. Two milliliters of conc. hydrochloric acid is added to the mixture. The mixture is allowed to stand overnight at ambient temperatures. The product is purified by vacuum distillation to yield: $CH_2=C(CH_3)—COO—CH(CH_3)—OCH_2CH_3$. This product is reacted with $Me_3SiO(Me_2SiO)_{50}(C_6H_5C_2H_4SiMeO)_9$ $(MeHSiO)_6SiMe_3$ to give an adduct which has the formula:

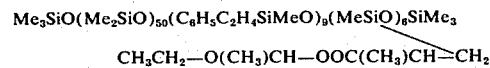

Hydrolysis of the adduct at a pH of 2-4 gives an organosilicon hydroxy compound which has the formula:

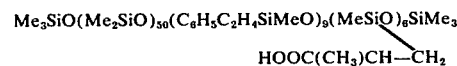

The term "sparging" is used above to denote passing an inert gas through a liquid that is maintained at an elevated temperature to facilitate removal of undesirable volatile materials from the liquid volatilization.

What is claimed is:

1. A process which comprises
   I. reacting (a) a silicon compound containing an SiH group with (b) a reaction product formed by reacting (i) an olefinically unsaturated compound containing a hydroxyl group selected from the group consisting of alkenols, alkenyl substituted phenols and alkenyl carboxylic acids with (ii), an enol ether by the addition of the hydroxyl group of (i) to the olefinic double bond of (ii), the reaction of (a) and (b) being conducted in the presence of (c) a catalyst for the addition of SiH to the olefinic double bonds, to effect the addition of the SiH group of (a) to the olefinic double bond of (b), and
   II. subjecting the organosilicon adduct produced in (I) to hydrolytic conditions to regenerate the hydroxyl group.

2. A process as claimed in claim 1 wherein (a) is a silane having the formula:

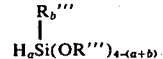

wherein R''' is a monovalent hydrocarbon group free of aliphatic carbon to carbon multiple bonds, a has a value from 1 to 3 inclusive, $b$ has a value from 0 to 2 inclusive and ($a+b$) has a value from 1 to 3 inclusive and (b) is the reaction product of an alkenol and an enol ether.

3. A process as claimed in claim 1 wherein (a) is a silane having the formula:

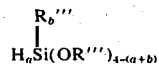

wherein R''' is a monovalent hydrocarbon group free of aliphatic carbon to carbon multiple bonds, $a$ has a value from 1 to 3 inclusive, $b$ has a value from 0 to 2 inclusive and ($a+b$) has a value from 1 to 3 inclusive and (b) is the reaction product of a monoalkenyl ether of a polyoxyalkylene glycol and an enol ether.

4. A process as claimed in claim 1 wherein (a) is a hydrosiloxane containing a group represented by the formula:

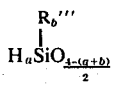

wherein R''' is a monovalent hydrocarbon group free of aliphatic carbon to carbon multiple bonds, $a$ has a value from 1 to 3 inclusive, $b$ has a value from 0 to 2 inclusive and ($a+b$) has a value from 1 to 3 inclusive and (b) is the reaction product of an alkenol and an enol ether.

5. A process as claimed in claim 1 wherein (a) is a hydrosiloxane containing a group represented by the formula:

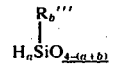

wherein R''' is a monovalent hydrocarbon group free of aliphatic carbon multiple bonds, $a$ has a value from 1 to 3 inclusive, $b$ has a value from 0 to 2 inclusive and ($a+b$) has a value from 1 to 3 inclusive and (b) is the reaction product of a monoalkenyl ether of a polyoxyalkylene glycol and an enol ether.

6. As a novel composition of matter an organosilicon adduct produced as claimed in part (I) of claim 2.

7. As a novel composition of matter an organosilicon adduct produced as claimed in part (I) of claim 3.

8. A process as claimed in claim 4 wherein the hydrolysis of part (II) of said claim is conducted at a pH from 3 to 4 inclusive.

9. A process as claimed in claim 5 wherein the hydrolysis of part (II) of said claim is conducted at a pH from 3 to 4 inclusive.

* * * * *